(12) United States Patent
Fredholm

(10) Patent No.: US 10,273,179 B2
(45) Date of Patent: Apr. 30, 2019

(54) GLASS MANUFACTURING SYSTEM AND METHOD FOR FORMING A HIGH QUALITY THIN GLASS SHEET

(71) Applicant: CORNING INCORPORATED, Corning, NY (US)

(72) Inventor: Allan Mark Fredholm, Vulaines sur Seine (FR)

(73) Assignee: Corning Incorporated, Corning, NY (US)

( * ) Notice: Subject to any disclaimer, the term of this patent is extended or adjusted under 35 U.S.C. 154(b) by 469 days.

(21) Appl. No.: 14/295,848

(22) Filed: Jun. 4, 2014

(65) Prior Publication Data
US 2014/0283554 A1 Sep. 25, 2014

Related U.S. Application Data

(62) Division of application No. 13/202,110, filed as application No. PCT/US2010/024690 on Feb. 19, 2010.

(30) Foreign Application Priority Data

Feb. 23, 2009 (EP) ..................................... 09305168

(51) Int. Cl.
*C03B 17/06* (2006.01)
(52) U.S. Cl.
CPC .......... *C03B 17/061* (2013.01); *C03B 17/062* (2013.01); *C03B 17/067* (2013.01); *C03B 17/068* (2013.01)

(58) Field of Classification Search
CPC ...... C03B 17/06; C03B 17/064; C03B 17/067
See application file for complete search history.

(56) References Cited

U.S. PATENT DOCUMENTS

| | | | |
|---|---|---|---|
| 2,276,615 A | 3/1942 | Hazelett | |
| 2,457,785 A | 12/1948 | Slayter et al. | |
| 2,760,309 A | 8/1956 | Laverdisse | |
| 2,986,844 A | 6/1961 | Lane, Jr. | |
| 3,107,162 A | 10/1963 | Nyquist et al. | |
| 3,206,292 A | 9/1965 | Pilkington et al. | |
| 3,367,762 A | 2/1968 | Teague, Jr. | |
| 3,450,518 A | 6/1969 | Itakura et al. | |
| 3,622,298 A | 11/1971 | Machian | |
| 3,655,355 A | 4/1972 | Tissier | |
| 3,694,180 A | 9/1972 | Demarest, Jr. | |
| 3,723,082 A * | 3/1973 | Knowles et al. ...... | C03B 17/064 65/162 |
| 4,175,942 A | 11/1979 | Lipp | |

(Continued)

FOREIGN PATENT DOCUMENTS

| | | | |
|---|---|---|---|
| CN | 1537081 A | 10/2004 | ............. C03B 17/06 |
| CN | 1721347 | 1/2006 | |

(Continued)

*Primary Examiner* — Cynthia Szewczyk
(74) *Attorney, Agent, or Firm* — Ryan T. Hardee

(57) ABSTRACT

A glass manufacturing system and method are described herein for forming a high quality thin glass sheet. In one embodiment, the glass manufacturing system and method use at least one of a compensated rolling roll, a temperature controlled environment and edge rolls to form a high quality thin glass sheet that has a thickness less than about 2 mm and more preferably less than about 100 μm.

8 Claims, 5 Drawing Sheets

(56) References Cited

U.S. PATENT DOCUMENTS

| | | | |
|---|---|---|---|
| 5,968,857 A | 10/1999 | Pinckney | |
| 6,758,064 B1 | 6/2004 | Kariya | |
| 6,896,646 B2 | 5/2005 | Kaiser et al. | 492/40 |
| 7,213,414 B2 | 5/2007 | Shiraishi et al. | |
| 7,430,880 B2 | 10/2008 | Butts et al. | |
| 2007/0062219 A1 | 3/2007 | Blevins et al. | |
| 2008/0184741 A1 | 8/2008 | Mueller | |
| 2008/0282736 A1* | 11/2008 | Filippov | C03B 17/064 65/90 |
| 2009/0226733 A1* | 9/2009 | Kato | C03B 17/067 428/428 |
| 2010/0126226 A1 | 5/2010 | Zhou et al. | 65/158 |
| 2010/0293998 A1* | 11/2010 | Burdette | C03B 17/067 65/29.14 |

FOREIGN PATENT DOCUMENTS

| | | | |
|---|---|---|---|
| CN | 101189193 A | 5/2008 | C03B 23/47 |
| CN | 101312918 | 11/2008 | C03B 17/06 |
| EP | 1746076 A1 | 1/2007 | |
| EP | 2077254 A | 8/2009 | |
| JP | 5124826 A | 5/1993 | |
| JP | H11-139837 | 5/1999 | C03B 13/04 |
| TW | 200829523 | 7/2008 | C03B 17/00 |

\* cited by examiner

GLASS MANUFACTURING SYSTEM AND METHOD FOR FORMING A HIGH QUALITY THIN GLASS SHEET

CROSS-REFERENCE TO RELATED APPLICATIONS

The instant application is a divisional application of U.S. patent application Ser. No. 13/202,110 filed Aug. 18, 2011 which claims the benefit of priority of International Application Serial No. PCT/US10/24690 filed on Feb. 19, 2010 which claims the benefit of priority to European Application No. 09 305 168.8 filed on Feb. 23, 2009.

TECHNICAL FIELD

The present invention relates in general to the glass manufacturing field and, in particular, to a glass manufacturing system and method for forming a high quality thin glass sheet which has a thickness less than about 2 mm and more preferably less than about 100 μm.

BACKGROUND

Today there is an increased need for very high quality glass sheets because of the development of flat display applications such as personal computer (PC) monitors, television (TV) monitors, personal digital assistants (PDAs) and other hand held devices, and perspectives for flat organic light emitting diode (OLED) displays and lighting technologies. In particular, there is an increased need today for very high quality glass sheets which are also flexible and have sufficiently small thicknesses (e.g., roughly below 150 μm thickness).

Some existing glass manufacturing systems and processes which use a fusion draw or a slot draw can produce glass sheets with such low thicknesses but they either have high production costs or do not yield sufficient surface quality. For instance, existing glass manufacturing systems which incorporate a slot draw produce inferior quality glass sheets with small thicknesses and also have high production costs. In contrast, the existing glass manufacturing systems which incorporate a fusion draw can produce very good quality glass sheets with small thicknesses but they have high production costs.

In addition, the existing glass manufacturing systems which incorporate the fusion draw and slot draw are limited to the production of glasses that do not devitrify easily. In particular, the fusion draw and the slot draw processes require the delivery of a molten glass which has a fairly high viscosity that is for instance greater than about 50,000 poises at the last point where the molten glass touches a non-moving body, like at a root of an isopipe in the fusion draw process or at an exit of a slot in the slot draw process. Unfortunately, there are a lot of glasses that do not meet this viscosity limitation so they can not be used to make thin glass sheets when utilizing the fusion draw process or the slot draw process. Accordingly, there has been and is a need to address the aforementioned shortcomings and other shortcomings associated making high quality thin glass sheets. These needs and other needs are satisfied by glass manufacturing system and method of the present invention.

SUMMARY

In one aspect, the present invention provides a glass manufacturing system that includes: (a) a delivery system where molten glass transitions from a guided flow to a free fall flow; (b) a rolling roll pair having two rolling rolls which receive the molten glass free falling from the delivery system and roll the molten glass to form a glass sheet; and (c) drawing and stretching the glass sheet in a temperature controlled environment with a cross temperature gradient where two outer edges of the glass sheet are exposed to a hotter temperature than a central portion of the glass sheet. The temperature controlled environment provides the cross temperature gradient to stretch the glass sheet such that the glass sheet has a substantially constant thickness. If desired, the glass manufacturing system may also utilize at least one of a compensated rolling roll pair, edge roll pair(s) and a pulling roll pair to help manufacture the glass sheet In another aspect, the present invention provides a method for manufacturing a glass sheet, where the method includes the steps of: (a) providing a molten glass; (b) rolling the molten glass between two rolling rolls to form a glass sheet; (c) heating the glass sheet in a temperature controlled environment which has a cross temperature gradient such that two outer edges of the glass sheet are exposed to a hotter temperature than a central portion of the glass sheet, and (d) drawing and stretching the sheet in the temperature controlled environment. The temperature controlled environment provides the cross temperature gradient to stretch the glass sheet such that the glass sheet has a substantially constant thickness. If desired, the method may also utilize at least one of a compensated rolling roll pair, edge roll pair(s) and a pulling roll pair to help manufacture the glass sheet.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1A:
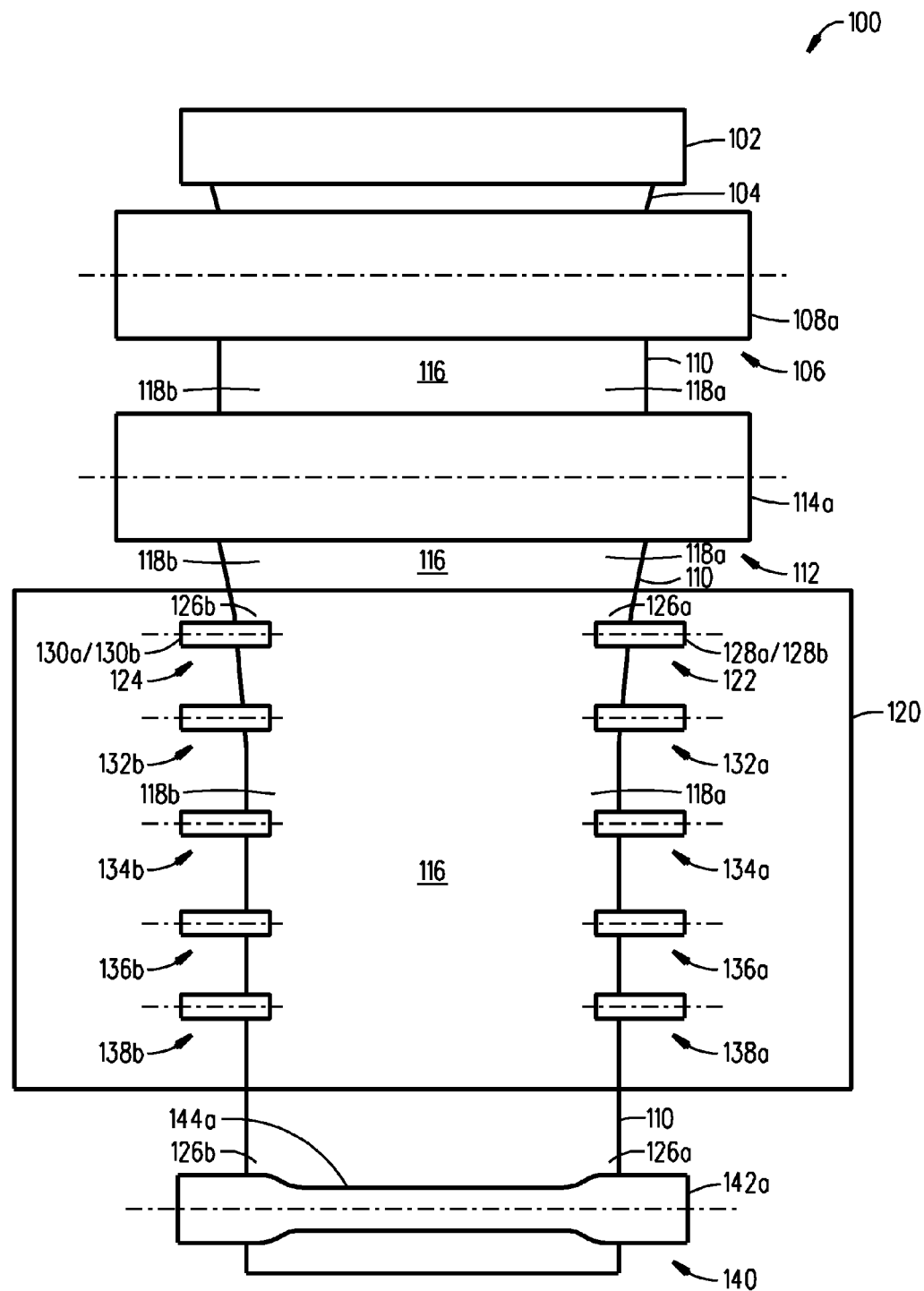
FIGS. 1A and 1B are respectively a front view and side view of an exemplary glass manufacturing system having a vertical rolling configuration in accordance with an embodiment of the present invention.
Figure 1B:
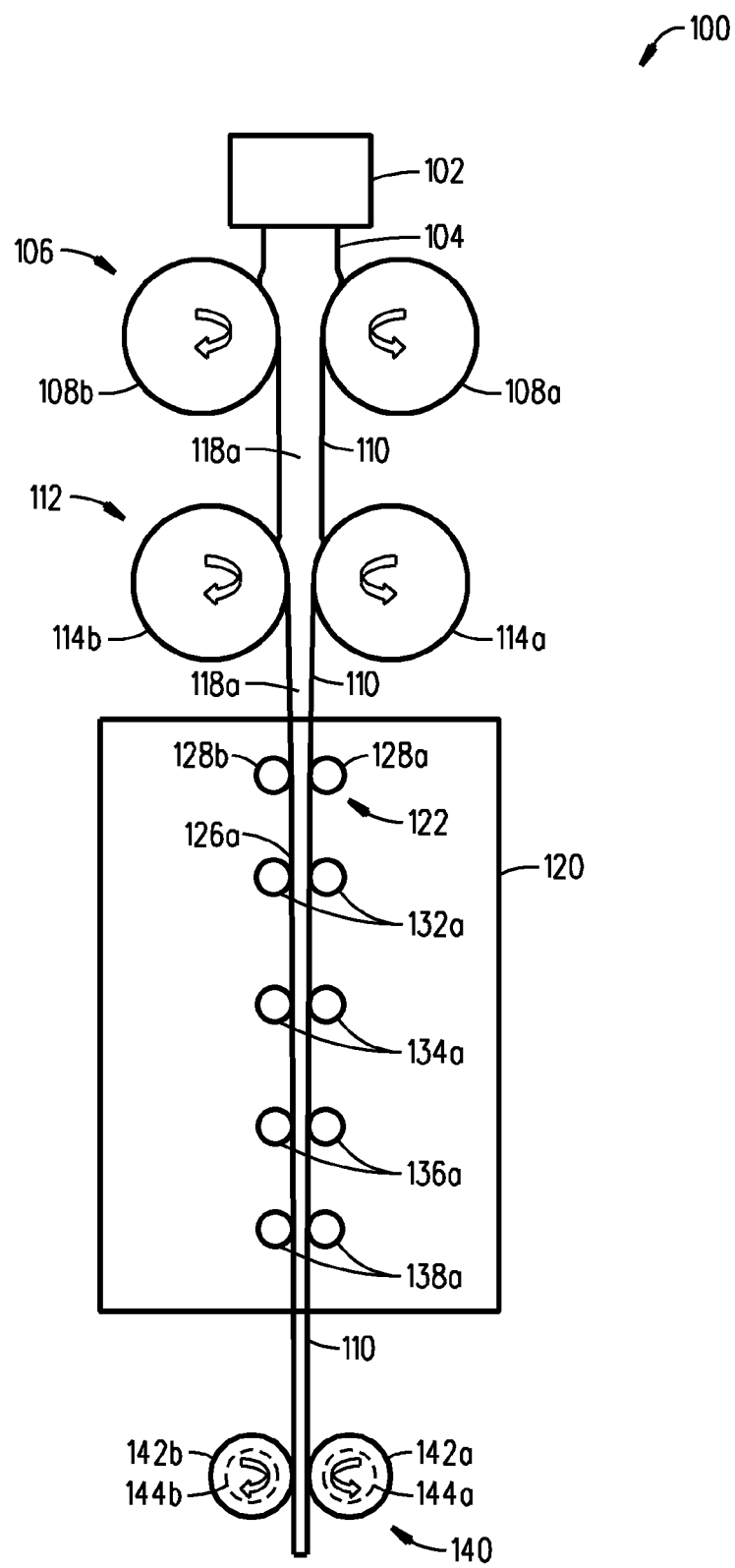

Referring to FIGS. 1A and 1B, there are respectively shown a front view and a side view of an exemplary glass manufacturing system 100 in accordance with an embodiment of the present invention. The exemplary glass manufacturing system 100 includes a delivery system 102 within which there is a guided flow of molten glass 104 (not shown) that transitions to a free fall flow of molten glass 104 which is provided to a rolling roll pair 106. The rolling roll pair 106 has two rolling rolls 108a and 108b which receive the free falling molten glass 104 and roll the molten glass 104 to form a glass sheet 110. In one embodiment, the rolling roll pair 106 is provided molten glass 104 that has a viscosity approximately between about 150-10,000 poises. Some examples of molten glass 104 with a viscosity between about 150-10,000 poises include the commercial D0035 glass from Corning Inc., the precursor glass of the commercial Kerablack glass ceramic from Eurokera and the precursor glass of spinel glass ceramics described in U.S. Pat. No. 5,968,857 (the contents of which are incorporated by reference herein). The two rolling rolls 108a and 108b can roll the molten glass 104 to form the glass sheet 110 which has a thickness typically between about 2-5 mm and a surface roughness as low as 4 nm Ra and even 1 nm Ra can be achieved.

If desired, the glass manufacturing system 100 can have one or more additional rolling roll pairs 112 (one shown) each with rolling rolls 114a and 114b located below the rolling roll pair 106 which further roll and more accurately form the glass sheet 110. Also, one or both of the rolling rolls 108a and 108b (and if desired one or both of the rolling rolls 114a and 114b) may be a compensated rolling roll such that when the molten glass 104 is rolled between the rolling rolls 108a and 108b (and if used rolling rolls 114a and 114b) then the glass sheet 110 formed has a central portion 116 that is thicker relative to the two outer edges 118a and 118b. A detailed discussion about several exemplary compensated rolling roll(s) is provided below when discussing the experimental glass manufacturing systems 100. Lastly, the rolling rolls 108a and 108b (and if used rolling rolls 114a and 114b) may be driven by one or more drive controllers-motors (not shown). The drive controllers-motors can be used to control the speed at which the molten glass 104 is rolled, the torque at which the molten glass 104 is rolled, or a combination of both speed and torque that the molten glass 104 is rolled to obtain the glass sheet 110.

The glass manufacturing system 100 also includes a temperature controlled environment 120 in which there is a cross temperature gradient where the two outer edges 118a and 118b of the glass sheet 110 are exposed to a hotter temperature than the central portion 116 of the glass sheet 110. The temperature controlled environment 120 provides the cross temperature gradient to draw and stretch the glass sheet 110 such that most if not all of the glass sheet 110 has a substantially constant thickness which is preferably less than about 2 mm and more preferably less than about 100 μm. The substantially constant thickness discussed herein is the thickness across the width of the glass sheet 110 as opposed to the thickness from the top-to-bottom of the drawn glass sheet 110. In one embodiment, the temperature controlled environment 120 can be made by enclosing at least a section of the process and using (for example): (1) thermal insulation to limit cooling from outside the manufacturing process; (2) active cooling such as forced air, or radiative heat sinks such as water cooled devices etc. to maintain a lower temperature at the central portion 116 of the glass sheet 110; and/or (3) active heating such as electric heating that is applied through windings of heated tubes etc. to reheat the glass sheet 110 and in particular reheat the outer edges 118a and 118b of the glass sheet 110. A main purpose of the temperature controlled environment 120 is to slightly re-soften the glass sheet 110 after the rolling operation to draw and stretch the glass sheet 110 using a reasonably low force. This re-heated zone should be rather compact, i.e. not too long down below the rolling roll pairs 106 and 112 since a reheat zone that is too long would lead to an increased loss of width in the glass sheet 110. In fact, the temperature controlled environment 120 can have several different zones in sequence and within one or more of these zones the two outer edges 118a and 118b of the glass sheet 110 may be exposed to a colder temperature than the central portion 116 of the glass sheet 110.

The glass manufacturing system 100 if desired can include a first edge roll pair 122 and a second edge roll pair 124, where a first edge portion 126a of the glass sheet 110 is drawn between two edge rolls 128a and 128b which are associated with the first edge roll pair 122, and an opposing second edge portion 126b of the glass sheet is drawn between two edge rolls 130a and 130b associated with the second edge roll pair 124. The first and second edge roll pair 122 and 124 are located within the temperature controlled environment 120 which maintains a temperature that enables an adequate glass viscosity such that the glass sheet 110 can be stretched while substantially maintaining a width of the glass sheet 110. As shown, there can be one or more additional edge roll pairs 132a, 132b, 134a, 134b, 136a, 136b, 138a and 138b located below the first and second edge roll pairs 122 and 124 to further draw and stretch the glass sheet 110 while substantially maintaining the width of the glass sheet 110.

In operation, the edge roll pairs 122, 124, 132a, 132b, 134a, 134b, 136a, 136b, 138a and 138b touch the glass sheet 110 while it is still in a formable condition for instance below $10^7$ poises and avoid contacting the glass sheet 110 in the central portion 116 which is otherwise known as the usable part or the quality area. The edge roll pairs 122, 124, 132a, 132b, 134a, 134b, 136a, 136b, 138a and 138b cause the glass sheet 110 to locally follow the linear speed of the corresponding edge rolls and will usually cause some sort of deformation of the glass sheet 110 such as for example local thinning or imprinting some pattern that is machined on the surfaces of the edge rolls but will substantially maintain the width of the glass sheet 110. Lastly, one or more of the edge rolls pairs 122, 124, 132a, 132b, 134a, 134b, 136a, 136b, 138a and 138b may be driven by one or more drive controllers-motors (not shown). The drive controllers-motors can be used to control the speed at which the glass sheet 110 is drawn, the torque at which the glass sheet 110 is drawn, or a combination of both speed and torque that the glass sheet 110 is drawn.

The glass manufacturing system 100 can also include if desired one or more pulling roll pairs 140 (one shown) where each pulling roll pair has two pulling rolls 142a and 142b which receive and further draw and stretch the glass sheet 110 to help obtain the desired thickness in at least its central portion 116 (usable part). The pulling roll pair 140 receives the glass sheet 110 from the temperature controlled environment 120 and if used the lowest edge roll pairs 138a and 138b (for example). The pulling roll pair 140 operates at a lower temperature when compared to the temperature controlled environment 120 and its main function is to impose a speed on the glass sheet 110. At this point, the glass sheet 110 depending on the temperature could have a viscosity of $10^{13}$ poises. In this embodiment, the two pulling rolls 142a and 142b extend across the width of the glass sheet 110 but have an undercut 144a and 144b formed therein so that the glass sheet 110 is contacted only near the two outer edges 126a and 126b. In an alternative embodiment, the pulling roll pair 140 could have four rolls where two rolls grab one outer edge 126a and the other two rolls grab the other outer edge 126b. Lastly, one or more of the pulling rolls 142a and 142b associated with the pulling roll pair 140 may be driven by one or more drive controllers-motors (not shown). The drive controllers-motors can be used to control the speed at which the glass sheet 110 is drawn, the torque at which the glass sheet 110 is drawn, or a combination of both speed and torque that the glass sheet 110 is drawn.

In view of the above, another embodiment of the invention includes a glass manufacturing system (100, 100', 100") comprising:

a delivery system (102) where molten glass (104) transitions from a guided flow to a free fall flow;

a rolling roll pair (106) having two rolling rolls (108a, 108b) which receive the free fall flow of the molten glass and roll the molten glass to form a glass sheet (110), wherein the molten glass has a viscosity in a range of 150-10,000 poises when received by the two rolling rolls, wherein the glass sheet has a thickness between about 2-5 mm and a roughness between about 1-4 nm Ra after being drawn by the two rolling rolls;

a temperature controlled environment (120) with a cross temperature gradient where two outer edges (118a, 118b) of the glass sheet are exposed to a hotter temperature than a central portion (116) of the glass sheet, wherein the temperature controlled environment provides the cross temperature gradient to draw stretch the glass sheet such that the glass sheet has a substantially constant thickness; and at least one of: (1) a first edge roll pair (122) and a second edge roll pair (124), the first edge roll pair and the second edge roll pair are both located within the temperature controlled environment, a first edge portion (126a) of the glass sheet is drawn between two edge rolls (128a, 128b) associated with the first edge roll pair and an opposing second edge portion (126b) of the glass sheet is drawn between two edge rolls (130a, 130b) associated with the second edge roll pair, whereby the first edge roll pair and the second edge roll pair draw and stretch the glass sheet in the temperature controlled environment while substantially maintaining a width of the glass sheet, or (2) a pulling roll pair located below the temperature controlled environment which receive the glass sheet and draw and stretch the glass sheet in the temperature controlled environment, wherein the cross temperature gradient provided by the temperature controlled environment causes the glass sheet to stretch such that the glass sheet has a substantially constant thickness.

In such an embodiment, for example, at least one of the rolling rolls can be a compensated roll such that when the molten glass is rolled between the rolling rolls then the glass sheet formed has a center portion that is thicker relative to the two outer edges.

Such an embodiment may also further comprise at least one pair of pulling rolls (140) where each pair of pulling rolls has two pulling rolls (142a, 142b) which receive and draw the glass sheet after the glass sheet has travelled through the temperature controlled environment.

A glass manufacturing system 100 which utilizes the rolling roll pair(s) 106 and 112 (possibly the optional compensated rolling roll pair(s) 106 and 112), the temperature controlled environment 120, and possibly the optional edge roll pair(s) 122, 124, 132a, 132b, 134a, 134b, 136a, 136b, 138a and 138b, and the optional pulling roll pair(s) 140 can manufacture a glass sheet 110 that has a thickness less than about 2 mm and a roughness less than about 4 nm Ra and more preferably a thickness less than about 100 μm and a roughness of about 0.25 nm Ra. In addition, the glass manufacturing system 100 can have very good thickness control where there is a substantially constant thickness within the central portion 116 of the glass sheet 110. It should be noted that stretching the glass sheet 110 after rolling does not necessarily result in the glass sheet 110 having a substantially constant thickness in the central portion 116 of the glass sheet 110. In the experiments described next it will be explained which types of process variants and parameters can be used to help the glass manufacturing system 100 produce the glass sheet 110 which has at least a central portion 116 thereof with a desired thickness distribution.

In these experiments, the glass manufacturing system 100 had four different setups as shown in TABLE #1.

TABLE #1

| Case | Rolling Rolls Thickness | Thermal environment gradient across the glass sheet | Edge rolls |
| --- | --- | --- | --- |
| A | Constant | No | No |
| B | Constant | Yes | No |
| C | Compensated | Yes | No |
| D | Compensated | Yes | Yes |

Note 1:
The experimental glass manufacturing system associated with case A did not contain any of the features of the present invention namely the compensated rolling roll, thermal environment gradient or edge rolls.

Note 2:
When a draw is applied after rolling, a loss in the width of the glass sheet 110 unavoidably occurs. The edge rolls can help limit this loss in width when compared to those cases where no edge rolls are present and the draw force would be applied by pulling rolls (for example) which are located far downstream of the rolling process.

Figure 2:
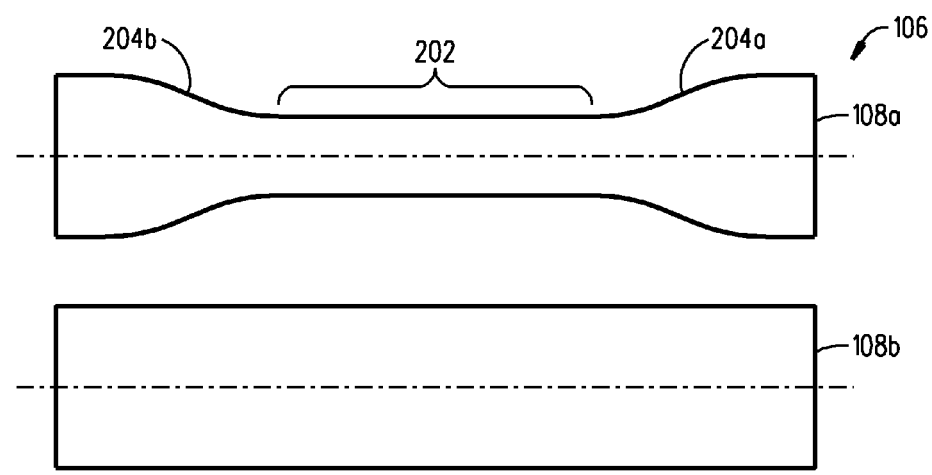
FIG. 2 is a diagram illustrating an exemplary compensated rolling roll pair that can be used in the glass manufacturing system shown in FIG. 1 in accordance with an embodiment of the present invention.
Figure 3:
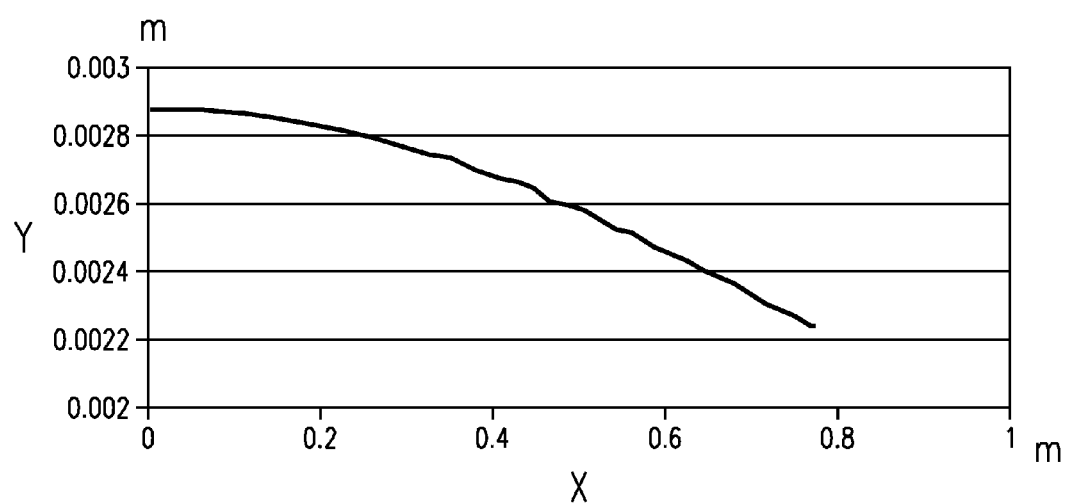
FIG. 3 is a graph that illustrates the shape of a glass sheet after being rolled by the compensated rolling roll pair shown in FIG. 2 in accordance with an embodiment of the present invention.

The experimental glass manufacturing systems 100 associated with cases A and B used one motor-driven constant rolling roll pair 106 in which both rolling rolls 108a and 108b had 17.5 cm diameters. In contrast, the experimental glass manufacturing systems 100 associated with cases C and D used one motor-driven compensated rolling roll pair 106 in which one rolling roll 108a was a compensated roll and the other rolling roll 108b was a flat roll such that when the molten glass 104 was rolled between the compensated roll 108a and the flat roll 108b then the glass sheet 110 formed had a central portion 116 that was thicker relative to the two outer edges 118a and 118b. FIG. 2 illustrates an exemplary compensated rolling roll pair 106 that has one flat roll 108b and one compensated roll 108a, where the compensated roll 108a has a central portion 202 with a diameter that is relatively small and then gradually increases in size as one moves toward the end portions 204a and 204b. FIG. 3 is a graph that illustrates the shape of the glass sheet 110 after being rolled by the compensated rolling roll pair 106 but before being drawn where the x-axis indicates the distance from a centerline (m) of the glass sheet 110 and the y-axis indicates the rolled thickness (m) of the glass sheet 110. Alternatively, the compensated rolling roll pair 106 may have two compensated rolling rolls 108a and 108b where both rolls have a central portion 202 with a diameter that is relatively small and then gradually increases in size as one moves toward the end portions 204a and 204b.

Figure 4:
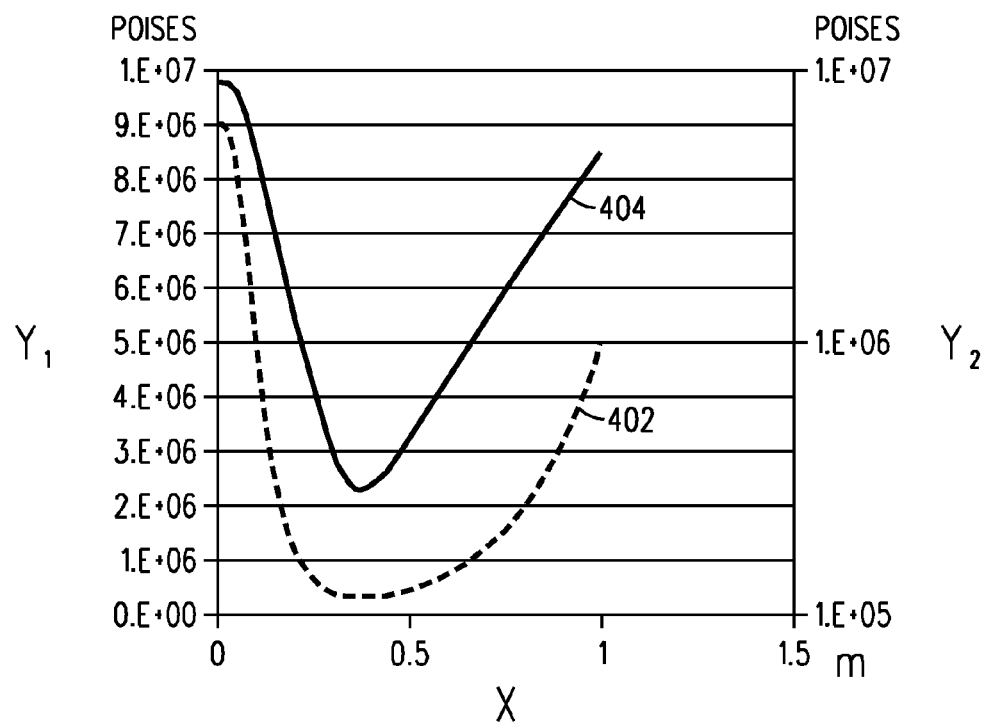
FIG. 4 is a graph that illustrates how a temperature controlled environment within the glass manufacturing system shown in FIG. 1 can be used to produce a glass sheet with a desired viscosity in accordance with an embodiment of the present invention.

The experimental glass manufacturing system 100 associated with case A did not utilize a temperature controlled environment 120. In contrast, the experimental glass manufacturing systems 100 associated with cases B-D did utilize a temperature controlled environment 120 in which there was a cross temperature gradient where the two outer edges 118a and 118b of the glass sheet 110 are exposed to a hotter temperature than the central portion 116 of the glass sheet 110. In particular, the temperature controlled environment 120 was created to produce a temperature on the center portion 116 of the glass sheet 110 which corresponds to the viscosity curves 402 and 404 shown in the graph of FIG. 4. In this graph, the x-axis indicates the distance (m) from the rolling roll pair 106, the $y_1$-axis (left side) associated with curve 402 indicates glass viscosity (poises), and the $y_2$-axis (right side) associated with curve 404 indicates log (viscosity). The temperature controlled environment 120 was made by enclosing a section of the manufacturing process below the rolling roll pair 106 and using electrical heaters to heat the outer edges 118a and 118b of the glass sheet 110 and using controlled heat loss to maintain the lower temperature at the central portion 116 of the glass sheet 110.

The experimental glass manufacturing systems 100 associated with cases A-C did not utilize edge rolls. In contrast, the experimental glass manufacturing system 100 associated with case D utilized one set of edge roll pairs 122 and 124 on each side of the glass sheet 110 where the first edge portion 126a of the glass sheet 110 was drawn between two edge rolls 128a and 128b associated with the first edge roll pair 122, and the opposing second edge portion 126b of the glass sheet 110 was drawn between two edge rolls 130a and 130b associated with the second edge roll pair 124. Each edge roll 128a, 128b, 130a and 130b had a 2 inch diameter and each touched a 3 cm width on either the first or second edge portion 126a and 126b of the glass sheet 110. In this setup, the edge rolls 128a, 128b, 130a and 130b where placed 0.5 m below the rolling roll pair 106 and within the temperature controlled environment 120. Lastly, the experimental glass manufacturing systems 100 associated with cases A-D utilized one pulling roll pair 140 which was located 1.5-2 m below the rolling roll pair 106. The pulling roll pair 140 had two pulling rolls 142a and 142b which had a 100 mm outer diameter and extended across the width of the glass sheet 110 but they had an undercut 144a and 144b so that the glass sheet 110 was contacted only near the two outer edges 126a and 126b.

In all of the cases A-D, the experimental glass manufacturing systems 100 used a glass ceramic precursor having the following composition: $SiO_2$ 68.25 wt %, $Al^2O_3$ 19.2 wt %, $Li_2O$ 3.5 wt %, MgO 1.2 wt %, ZnO 1.6 wt %, BaO 0.8 wt %, $TiO_2$ 2.6 wt %, $ZrO^2$ 1.7 wt %, $As^3O_4$ 0.6 wt %, $Na_2O+K_2O$ 0.35 wt %, and $V_2O_5$ 0.2 wt %. Of course, the glass manufacturing system 100 can use different materials in a glass state (e.g., glass or glass ceramic precursors) to manufacture many different types of glass sheets 110 including for example: a glass-ceramic sheet, a borosilicate glass sheet (e.g., Pyrex® glass), a white crown glass sheet, or an alkali-free glass sheet. The experimental glass manufacturing systems 100 had a throughput of about 60 tons/day and flow density of about 90 pounds/hour per inch to manufacture 1.5 m wide glass sheets 110. The experimental glass manufacturing systems 100 had a rolling speed of about 3.75 m/min in which there was rolled a 3 mm thick glass sheet 110. The experimental glass manufacturing systems 100 also had redraw ratio of three in which an exit speed of the final glass sheet 110 was three times faster than the rolling speed of the upstream glass sheet 110. The results of these experiments are discussed next with respect to FIG. 5.

Figure 5:
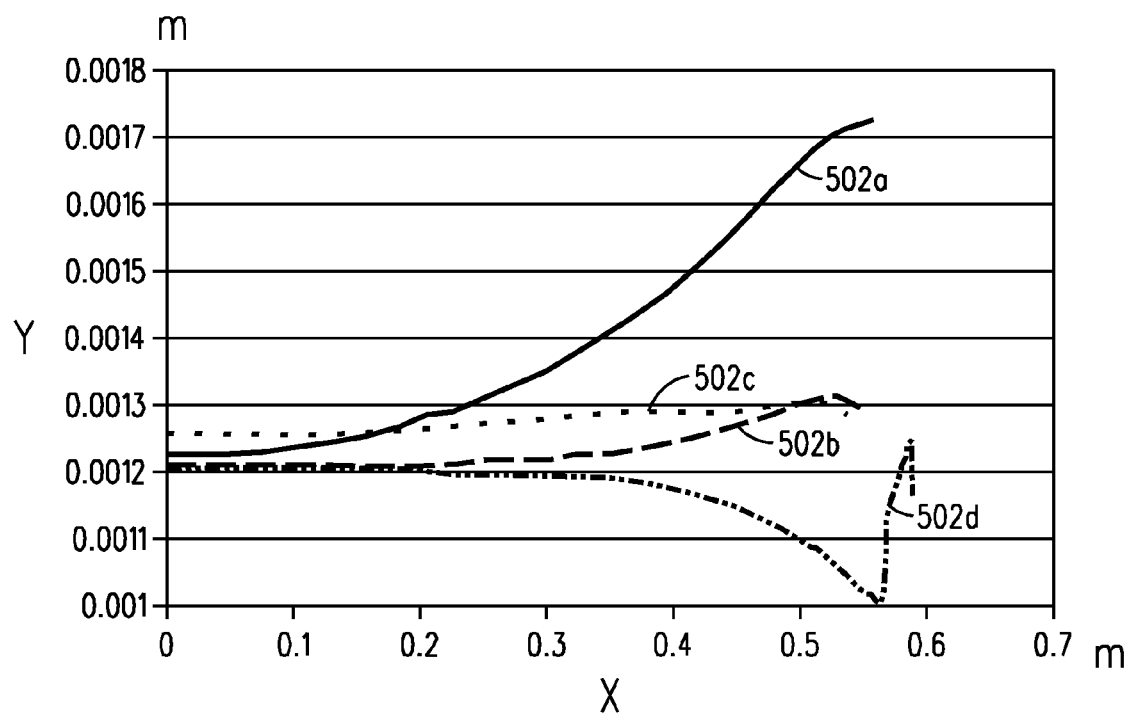
FIG. 5 is a graph that illustrates the final thickness profiles of glass sheets made by four different experimental glass manufacturing systems in accordance with different embodiments of the present invention.

Referring to FIG. 5, there is a graph that illustrates the final thickness profiles of the glass sheets 110 manufactured by the experimental glass manufacturing systems 100 based on cases A-D in accordance with different embodiments of the present invention. In this graph, the x-axis indicates the distance (m) from the centerline of the glass sheet 110, the y-axis indicates a local thickness (m), and cases A-D respectively correspond to lines 502a, 502b, 502c and 502d. As can be seen, if none of the features of the present invention namely the compensated rolling roll, thermal environment gradient or edge rolls are used then the result is unsatisfactory for the manufactured glass sheet 110 in terms of thickness uniformity and of how much width was retained (see curve 502a). It can also be seen that at least one of the features of the present invention should be used to manufacture desirable glass sheets 110 (see curves 502b, 502c and 502d). In fact, the glass manufacturing system 100 may use one, two or three of the features of the present invention in any combination to manufacture desirable glass sheets 110. In particular, these experiments illustrated the effects of the following features:

Shaping one of the rolling rolls 106 to initially roll a glass sheet 110 with a non-uniform thickness.

Applying a cross temperature gradient in which the glass sheet 110 had sides 118a and 118b that where exposed to a 100° C. hotter environment than the central portion 116.

Applying a set of edge rolls 122 and 124 on each side 126a and 126b of the glass sheet 110, where the edge rolls 122 and 124 are located 0.5 m away from the exit of the rolling rolls 106.

From the foregoing, it clearly appears that each type of modification namely the compensated rolling roll, thermal environment gradient or edge rolls has an influence on the thickness profile of the glass sheet 110. One should readily appreciate that with the present invention it is possible to manufacture a glass sheet 110 with a substantially constant thickness in the largest part of the width of the glass sheet 110 with a wide range of draw ratios. In addition, one should readily appreciate that the present invention can provide a process to provide high quality thin sheets of glass with one or more of the following attributes:

High throughput (1 Ton/hour/meter width achievable).

Low cost.

Below 1 mm and even down to below 100 μm glass thickness capability.

Accepting glass with liquidus viscosities of down to 5000 poises, optionally down to 200 poises.

Surface quality achieving 0.25 nm Ra range.

Form glass materials with very high strain points.

Compatible with alkali free glass compositions.

Figure 6:
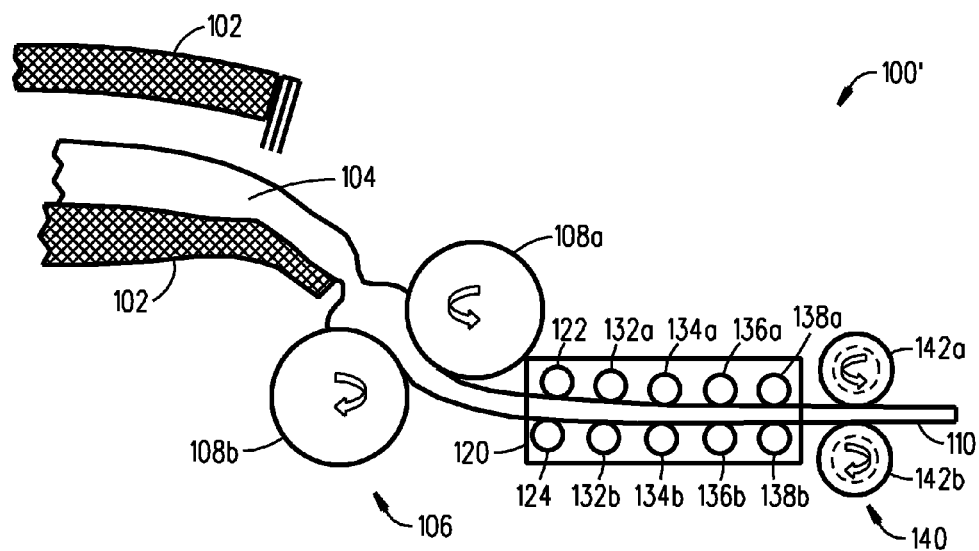
FIG. 6 is a side view of an exemplary glass manufacturing system having an inclined rolling configuration in accordance with an embodiment of the present invention.
Figure 7:
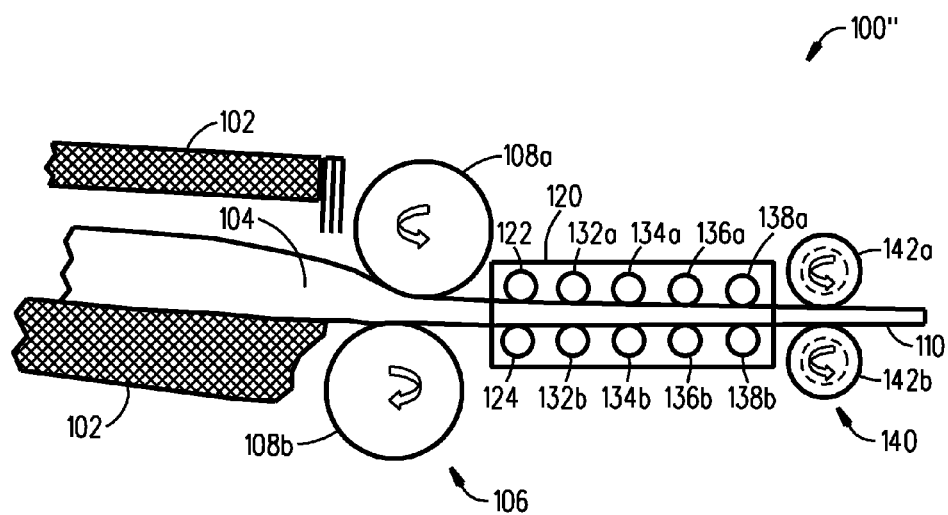
FIG. 7 is a side view of an exemplary glass manufacturing system having a horizontal rolling configuration in accordance with an embodiment of the present invention.

The exemplary glass manufacturing systems 100 described above with respect to FIGS. 1-5 used a vertical rolling configuration to manufacture the glass sheet 110 in accordance with an embodiment of the present invention. Alternatively, the present invention can have an embodiment in which a glass manufacturing system 100' had an inclined rolling configuration when manufacturing the glass sheet 110 as shown in FIG. 6. In yet another alternative, the present invention can have an embodiment in which a glass manufacturing system 100" had a horizontal rolling configuration when manufacturing the glass sheet 110 as shown in FIG. 7. The exemplary glass manufacturing systems 100 and 100' are shown with only one rolling roll pair 106 but they could have any number of rolling roll pairs.

Although several embodiments of the present invention have been illustrated in the accompanying Drawings and described in the foregoing Detailed Description, it should be understood that the invention is not limited to the disclosed embodiments, but is also capable of numerous rearrangements, modifications and substitutions without departing from the spirit of the present invention as set forth and defined by the following claims. It should also be noted that the reference to the "present invention" or "invention" used herein relates to exemplary embodiments and not necessarily to every embodiment that is encompassed by the appended claims.

The invention claimed is:

1. A method for manufacturing a glass sheet, said method comprising the steps of:
    rolling molten glass between two rolling rolls to form a glass sheet; and
    heating the glass sheet in a temperature controlled environment having a cross temperature gradient located below the two rolling rolls such that a central portion of the glass sheet has a first temperature lower than a second temperature of two outer edges of the glass sheet,
    wherein the temperature controlled environment provides the cross temperature gradient to stretch the glass sheet such that the glass sheet has a substantially constant thickness.

2. The method of claim 1, wherein the step of stretching the glass sheet comprises drawing a first edge portion of the glass sheet between two edge rolls associated with a first edge roll pair, and drawing an opposing second edge portion of the glass sheet between two edge rolls associated with a second edge roll pair, the first edge roll pair and the second edge roll pair are located within the temperature controlled environment, wherein the first edge roll pair and the second edge roll pair stretch the glass sheet while substantially maintaining a width of the glass sheet.

3. The method of claim 1, wherein at least one of the rolling rolls is a compensated roll such that when the molten glass is drawn between the rolling rolls then the glass sheet formed has a center portion that is thicker relative to the two outer edges.

4. The method of claim 1, further comprising another rolling step where another two rolling rolls receive the glass sheet and further roll the glass sheet before the glass sheet enters the temperature controlled environment.

5. The method of claim 1, further comprising a step of pulling the glass sheet by using at least one pair of pulling rolls where each pair of pulling rolls has two pulling rolls which receive and draw the glass sheet after the glass sheet has travelled through the temperature controlled environment.

6. The method of claim 1, where the glass sheet has a thickness between about 2-5 mm and a roughness between about 1-4 nm Ra after being drawn by the two rolling rolls and before entering the temperature controlled environment.

7. The method of claim 1, where the glass sheet has a thickness less than about 100 μm and a roughness about 0.25 nm Ra after travelling through the temperature controlled environment.

8. The method of claim 1, wherein the glass sheet is a glass-ceramic sheet, a borosilicate glass sheet, a white crown glass sheet, or an alkali-free glass sheet.

\* \* \* \* \*